US012759354B2

(12) United States Patent
Lathuiliere et al.

(10) Patent No.: US 12,759,354 B2
(45) Date of Patent: Oct. 13, 2026

(54) COMPUTER SYSTEM FOR ASSISTING IN COUPLING AND UNCOUPLING A SEMI-TRAILER TO A TRACTOR VEHICLE, METHOD AND VEHICLE COMPRISING SUCH A COMPUTER SYSTEM

(71) Applicant: VOLVO TRUCK CORPORATION, Gothenburg (SE)

(72) Inventors: Daniel Lathuiliere, Miribel (FR); Yannick Sanchez, St Romain en Gal (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 31 days.

(21) Appl. No.: 18/648,704

(22) Filed: Apr. 29, 2024

(65) Prior Publication Data

US 2024/0367469 A1 Nov. 7, 2024

(30) Foreign Application Priority Data

May 5, 2023 (EP) .................................... 23171935

(51) Int. Cl.
*B60D 1/36* (2006.01)
*B60W 10/18* (2012.01)
(Continued)

(52) U.S. Cl.
CPC ............ *B60D 1/36* (2013.01); *B60W 10/182* (2013.01); *B60W 30/182* (2013.01);
(Continued)

(58) Field of Classification Search
CPC .. B60D 1/36; B60D 1/28; B60D 1/62; B60W 10/182; B60W 30/182; B60W 50/14; B60W 2050/146; B60W 2300/14; B60W 2510/186; B60W 2050/143; B60W 50/0098; B60W 2300/145;
(Continued)

(56) References Cited

U.S. PATENT DOCUMENTS

2021/0009143 A1 1/2021 Niewiadomski et al.

FOREIGN PATENT DOCUMENTS

WO 2018035566 A1 3/2018
WO 2020051619 A1 3/2020
(Continued)

OTHER PUBLICATIONS

European Search Report in corresponding European Application No. 23171935.2 dated Sep. 22, 2023 (2 pages).

*Primary Examiner* — Brian A Zimmerman
*Assistant Examiner* — Cal J Eustaquio
(74) *Attorney, Agent, or Firm* — Jeffri A. Kaminski; Venable LLP

(57) ABSTRACT

A computer system, for assisting in coupling and uncoupling a semi-trailer to a tractor vehicle, includes processing circuitry configured to use information provided by at least one sensor to automatically check whether a plurality of elements of the semi-trailer and the tractor vehicle are in a first safe position, in a second safe position or in a third position. The computer system unlocks a tractor vehicle parking brake if all the elements are in the first safe position or if all the elements are in the second safe position and locks the tractor vehicle parking brake if at least one of the elements is in a different position than the others or in the third position.

13 Claims, 5 Drawing Sheets

(51) Int. Cl.
*B60W 30/182* (2020.01)
*B60W 50/14* (2020.01)
*B62D 53/08* (2006.01)

(52) U.S. Cl.
CPC ......... *B60W 50/14* (2013.01); *B62D 53/0842* (2013.01); *B60W 2050/146* (2013.01); *B60W 2300/14* (2013.01); *B60W 2510/186* (2013.01)

(58) Field of Classification Search
CPC ..... B60W 2530/203; B60W 2710/186; B60W 2710/188; B62D 53/0842; B60T 7/12; B60T 7/20; B60T 2270/413; B60T 8/1708
See application file for complete search history.

(56) References Cited

FOREIGN PATENT DOCUMENTS

| | | | |
|---|---|---|---|
| WO | 2022150720 | A2 | 7/2022 |
| WO | 2022150720 | A9 | 9/2022 |
| WO | 2022150720 | A3 | 11/2022 |

COMPUTER SYSTEM FOR ASSISTING IN COUPLING AND UNCOUPLING A SEMI-TRAILER TO A TRACTOR VEHICLE, METHOD AND VEHICLE COMPRISING SUCH A COMPUTER SYSTEM

TECHNICAL FIELD

The disclosure relates generally to tractor and semi-trailer vehicles. In particular aspects, the disclosure relates to a computer system for assisting in coupling and uncoupling a semi-trailer to a tractor vehicle, a method and a vehicle comprising such a computer system. The disclosure can be applied to heavy-duty vehicles, such as trucks, among other vehicle types.

BACKGROUND

The step of coupling or uncoupling a semi-trailer to a tractor vehicle is generally done manually by the driver. The coupling and uncoupling sequences/procedures have several steps, and if the driver forgets one, it could lead to safety issues or risk of equipment damage. Therefore, there is a need to make the coupling and uncoupling procedures safer.

SUMMARY

According to a first aspect of the disclosure, the invention relates to a computer system, for assisting in coupling or uncoupling a semi-trailer to a tractor vehicle through fifth wheel coupling, comprising a processing circuitry configured to:

- use information provided by at least one sensor to automatically check whether a plurality of elements of the semi-trailer and the tractor vehicle are in a first safe position, in a second safe position or in a third position;
- enable a tractor vehicle parking brake to be released if all the elements are in the first safe position or if all the elements are in the second safe position; and
- lock the tractor vehicle parking brake in an engaged position if at least one of the elements is in a different position than the others or in the third position.

The first aspect of the disclosure may seek to make the coupling or uncoupling safer, and reduce the risk of equipment damage using the computer system disclosed. A technical benefit may include allowing a truck driver to move the tractor vehicle only if all the elements of the semi-trailer and of the tractor vehicle are in a safe position and therefore avoiding a safety risk or a risk of damage. Thus, even if the truck driver forgets to set all elements in a safe position, the truck cannot leave, and the truck driver needs to check the elements.

In some examples, including in at least one preferred example, optionally the processing circuitry is configured to send a warning feedback signal on a human machine interface located in a cabin of the tractor vehicle if at least one of the elements is in a different position than the others or in the third position. A technical benefit may include indicating to the truck driver that some elements are not in the correct position so it can be corrected more easily.

In some examples, including in at least one preferred example, optionally the processing circuitry is configured to select one mode between a coupling mode and an uncoupling mode. A technical benefit may include allowing the truck driver to indicate if he or she has coupled or uncoupled the semi-trailer to the tractor vehicle, in order to tailor the response of the computer system.

In some examples, including in at least one preferred example, optionally the processing circuitry is configured to continuously monitor information provided by the at least one sensor in order to detect any change of position and as result to deduce that a coupling or uncoupling sequence has been initiated and select the same.

In some examples, including in at least one preferred example, optionally the processing circuitry is configured to, when the coupling mode or uncoupling mode is selected, check if the tractor vehicle parking brake is in applied status and, failing that, to automatically engage the tractor vehicle parking brake.

In some examples, including in at least one preferred example, optionally the processing circuitry is configured to enable the release of the tractor vehicle parking brake only after receiving a manual override signal or after semi-trailer is fully coupled or uncoupled.

In some examples, including in at least one preferred example, the processing circuitry is further configured to, when the coupling mode is selected, check if all the elements are in the first safe position. A technical benefit may include checking that the elements are in a position that indicates proper coupling between the semi-trailer and the tractor vehicle.

In some examples, including in at least one preferred example, optionally, when the coupling mode is selected, the warning feedback signal comprises information on each element that is in the second safe position or in the third position. A technical benefit may include using the feedback to display more specific information to better help the truck driver when coupling the semi-trailer to the tractor vehicle.

In some examples, including in at least one preferred example, optionally the processing circuitry is further configured to, when the coupling mode is selected, send a validation feedback signal on the human machine interface located in the cabin if all the elements are in the first safe position. A technical benefit may include informing the truck driver that coupling was performed properly.

In some examples, including in at least one preferred example, optionally the processing circuitry is further configured to, when the uncoupling mode is selected, check if all the elements are in the second safe position. A technical benefit may include checking that the elements are in a position that indicates proper uncoupling between the semi-trailer and the tractor vehicle.

In some examples, including in at least one preferred example, optionally, when the uncoupling mode is selected, the warning feedback signal comprises information on each element that is in the first safe position or in the third position. A technical benefit may include displaying more specific information to better help the truck driver when uncoupling the semi-trailer to the tractor vehicle.

In some examples, including in at least one preferred example, optionally the processing circuitry is further configured to, when the uncoupling mode is selected, send a validation feedback signal on the human machine interface if all the elements are in the second safe position. A technical benefit may include informing the truck driver that uncoupling was performed properly.

According to a second aspect of the disclosure, the invention further relates to a computer-implemented method, for assisting in coupling and uncoupling a semi-trailer to a tractor vehicle, comprising:

- using information provided by at least one sensor to automatically check, by a processing circuitry of a computer system, whether a plurality of elements of the semi-trailer and the tractor vehicle are in a first safe position, in a second safe position or in a third position;

enabling a tractor vehicle parking brake to be released if all the elements are in the first safe position or if all the elements are in the second safe position by the processing circuitry; and locking the tractor vehicle parking brake in an engaged position by the processing circuitry if at least one of the elements is in a different position than the others or in the third position.

The second aspect of the disclosure may seek to improve safety by allowing the truck driver to move the tractor vehicle only if all the elements of the semi-trailer and of the tractor vehicle are in a safe position and therefore cannot pose a safety risk or a risk of damage. A technical benefit may include having a method that determines whether the truck driver can safely move the tractor vehicle.

In some examples, including in at least one preferred example, optionally the elements comprise:

a combination of a fifth wheel, located on the tractor vehicle and a kingpin, located on the semi-trailer;

an electrical line, connected to the tractor vehicle;

a pneumatic hose, coupled to the tractor vehicle; and support legs, fixed to the semi-trailer.

A technical benefit may include checking some of the elements that pose the highest safety or damage risk.

In some examples, including in at least one preferred example, optionally in the first safe position:

the fifth wheel and the kingpin are coupled;

the electrical line is connected to the semi-trailer;

the pneumatic hose is coupled to the semi-trailer; and the support legs are in a retracted configuration.

A technical benefit may include checking the first safe position of some the elements, which pose the highest safety or damage risk.

In some examples, including in at least one preferred example, optionally in the second safe position:

the fifth wheel and the kingpin are uncoupled;

the electrical line is disconnected from the semi-trailer;

the pneumatic hose is uncoupled from the semi-trailer; and the support legs are in a deployed configuration.

A technical benefit may include checking the second safe position of some of the elements, which pose the highest safety or damage risk.

According to a third aspect of the disclosure, the invention further relates to a computer program product comprising program code for performing, when executed by the processing circuitry, the method described above.

The third aspect of the disclosure may seek to improve safety by allowing the truck driver to move the tractor vehicle only if all the elements of the semi-trailer and of the tractor vehicle are in a safe position and therefore cannot pose a safety risk or a risk of damage. A technical benefit may include implementing the method previously described using program code.

According to a fourth aspect of the disclosure, the invention further relates to a non-transitory computer-readable storage medium comprising instructions, which when executed by the processing circuitry, causes the processing circuitry to perform the method described above.

The fourth aspect of the disclosure may seek to improve safety by allowing the truck driver to move the tractor vehicle only if all the elements of the semi-trailer and of the tractor vehicle are in a safe position and therefore cannot pose a safety risk or a risk of damage. A technical benefit may include properly storing and implementing the method previously described.

According to a fifth aspect of the disclosure, the invention further relates to a truck, comprising a tractor vehicle, a semi-trailer and the computer system previously described, the tractor vehicle and the semi-trailer comprising a plurality of elements and at least one sensor adapted to check whether the elements of the semi-trailer and of the tractor vehicle are in a first safe position, in a second safe position or in a third position.

The fifth aspect of the disclosure may seek to improve safety by allowing the truck driver to move the tractor vehicle only if all the elements of the semi-trailer and of the tractor vehicle are in a safe position and therefore cannot pose a safety risk or a risk of damage. A technical benefit may include implementing the method previously described directly in the vehicle, to make its use easier.

In some examples, including in at least one preferred example, optionally the elements of the truck 20 comprise:

a combination of a fifth wheel, located on the tractor vehicle and a kingpin, located on the semi-trailer and adapted to be coupled to the fifth wheel;

an electrical line, connected to the tractor vehicle and adapted to be connected to the semi-trailer;

a pneumatic hose coupled to the tractor vehicle and adapted to be coupled to the semi-trailer; and support legs, fitted on the semi-trailer and adapted to be moveable between a retracted configuration and a deployed configuration.

A technical benefit may include having some elements critical for the coupling procedure, for the uncoupling procedure and for safe driving of the truck.

In some examples, including in at least one preferred example, optionally the at least one sensor comprises:

a first pressure sensor, adapted to detect a coupling of the pneumatic hose with the semi-trailer;

a voltage sensor, adapted to detect a connection of the electrical line to the semi-trailer;

a first position sensor, adapted to detect a coupling of the kingpin and the fifth wheel; and a second position sensor, adapted to detect a configuration of the support legs of the semi-trailer.

A technical benefit may include having sensors dedicated to check one element, and therefore choosing the sensor that is best adapted for each element.

In some examples, including in at least one preferred example, optionally the first position sensor is a magnetic sensor. A technical benefit may include having a durable and reliable sensor.

In some examples, including in at least one preferred example, optionally the first position sensor is an optical sensor. A technical benefit may include having a precise sensor.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
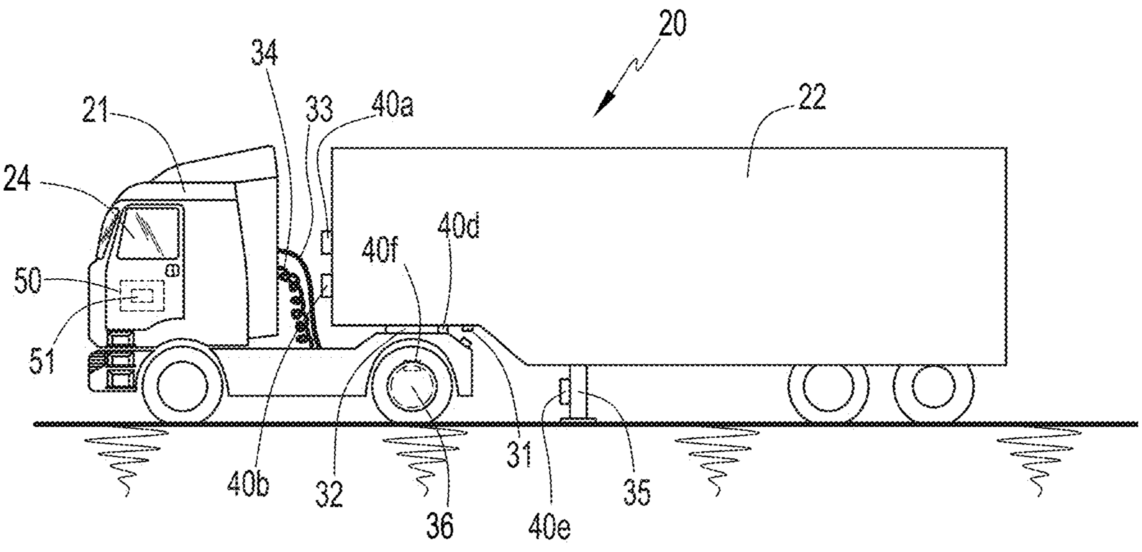
FIG. 1 is an exemplary truck according to an example.

FIG. 1 is an exemplary truck 20 according to an example. The truck 20 comprises a tractor vehicle 21 (also known as “tractor unit” or “tractor”) and a semi-trailer 22. The tractor vehicle 21 comprises a cab or cabin 24. The truck 20 comprises multiple elements such as a combination of a kingpin 31 located on the semi-trailer 22, and a fifth wheel 32 located on the tractor vehicle 21, an electrical line 33, also called power supply line 33, located on the tractor vehicle 21, a pneumatic hose 34, also called pneumatic supply line 34 located on the tractor vehicle 21, and two support legs 35 located on the semi-trailer 22. The truck 20 also comprises a tractor vehicle parking brake 36, located on the tractor unit 21. The tractor vehicle 21 may comprise multiple electrical lines 33, which may be used to power lamps located on the semi-trailer 22 for example, the electricity being supplied by a tractor vehicle battery, typically a 12V or 24V Lead-Acid battery. The tractor vehicle 21 may also comprise one or more pneumatic hose(s) 34, used to provide compressed air to a semi-trailer parking brake and a semi-trailer service brake for example. In known manner, the hose(s) 34 delivers compressed air to the trailer braking systems from an air compressor on-board of the tractor vehicle. The support legs 35 are located on either side of the semi-trailer 22 (left side and right side) and may be two or more in number. The support legs 35 can be moved up and down from a deployed configuration, where they touch the ground and stabilize the semi-trailer 22 in uncoupled configuration, to a retracted configuration where they do not touch the ground. A crank is usually provided to enable the driver to move the support legs 35 up and down.

In order to move the semi-trailer 22, the tractor vehicle 21 and the semi-trailer 22 need to be coupled to each other. When the tractor vehicle 21 and the semi-trailer 22 are coupled, each one of elements 31, 32, 33, 34 and 35 is in a first safe position. More precisely, the first safe position is a position/configuration in which the kingpin 31 and the fifth wheel 32 are properly mechanically coupled together, in which the electrical line 33 is connected to the semi-trailer 22, for example by being plugged into a dedicated electrical socket, in which the pneumatic hose 34 is coupled to the semi-trailer 22, for example by being plugged into a dedicated pneumatic port or by using dedicated handshake or gladhand connector(s), and in which the support legs 35 are in their retracted configuration.

When the tractor vehicle 21 and the semi-trailer 22 are uncoupled, each one of elements 31, 32, 33, 34 and 35 is in a second safe position. More precisely, the second safe position means is a position/configuration in which the kingpin 31 and the fifth wheel 32 are uncoupled, in which the electrical line 33 is disconnected from the semi-trailer 22, for example unplugged from the dedicated electrical socket, in which the pneumatic hose 34 is uncoupled from the semi-trailer 22, for example unplugged from the dedicated pneumatic port or semi-trailer pneumatic hose or hoses, and in which the support legs 35 are in their deployed configuration.

The elements 31, 32, 33, 34 and 35 may also be in a third position, which is distinct from the first safe position and from the second safe position. The third position can be for example the kingpin 31 and the fifth wheel 32 are not coupled properly, or only partially coupled, the electrical line 33 is improperly connected to the semi-trailer 22, such as not fully plugged or plugged in a socket different from the dedicated electrical socket, the pneumatic hose 34 is not properly coupled such that, for example, a leak is present, or plugged in a pneumatic port different from the dedicated pneumatic port, or when the support legs 35 are in an intermediate configuration between their retracted and deployed configurations. By properly coupled or connected or plugged, it is meant that an element 33 or 34 is coupled or connected or plugged safely, without being at risk of malfunctioning due to the element being uncoupled, disconnected or unplugged, and that the element works in an optimal manner. Therefore, by ‘improperly or not properly coupled or connected or plugged’, it is meant that the element is not coupled or connected or plugged safely and is at risk of malfunctioning, at risk of being untimely uncoupled, disconnected or unplugged, or that the element does not operate optimally.

The truck 20 further comprises at least one sensor 40 and a computer system 50. Preferably, and as shown in FIG. 1, multiple sensors 40 are located on the truck 20. These sensors 40 may comprise a pressure sensor **40*a*, a voltage sensor 40*b*, a first position sensor 40*d*, a second position sensor 40*e* and a second pressure sensor 40*f*. The sensors 40 listed here above are cited as an example of sensors, and there may be additional sensors 40 or sensors 40 of a different type on the truck 20**.

The pressure sensor **40*a* is located on the pneumatic hose 34, or on the corresponding dedicated pneumatic port, and is adapted to detect whether the pneumatic hose 34 is coupled with the semi-trailer 22 or not. If there are more than one pneumatic hoses 34, the pressure sensor 40*a* may be adapted to detect whether all the pneumatic hoses 34 are coupled with the semi-trailer 22 or not. Typically, the pneumatic hose 34 is considered to be properly connected whenever the pressure sensor measures a certain and predetermined pressure level corresponding to the operating pressure of semi-trailer braking systems. If the measured pressure is inferior to that predetermined pressure level, then it means that the pressure that is made available to the semi-trailer 22 is not sufficient. This might be the consequence of an air leak. The first voltage sensor 40*b* is located on the electric line 33 or on the corresponding dedicated electric socket, is for example a voltage divider, and is adapted to detect if the electrical line 33 is connected to the semi-trailer 22 or not. This can be done for example by detecting whether a trailer lamp circuit is opened or closed, or by detecting if electronic control units located in the semi-trailer 22, such as the ones controlling anti-lock braking system or the electronic braking system units are active. The first position sensor 40*d* may be located on the tractor vehicle 21, for example on the fifth wheel 32 and is adapted to detect whether the combination of the kingpin 31 and the fifth wheel 32 is coupled or not. The second position sensor 40***e* may be located on one of the support legs 35 and is adapted to detect if the support legs 35 are in the deployed, retracted, or intermediate configurations. The position sensors 40*d* and 40*e* are for example magnetic sensors, such as reed switches, Hall sensors or GMR sensors, or optical sensors. The sensors 40 are represented schematically on FIG. 1 and may be present in other locations of the truck 20. In other examples not shown, a handle lock sensor and a kingpin sensor are located on the fifth wheel, both of which are used to determine if the combination of the kingpin and the fifth wheel are properly coupled. The handle lock and the kingpin sensor may both be inductive sensors. A second pressure sensor 40*f* is adapted to detect if the tractor vehicle parking brake 36 is engaged or disengaged, or in other words, in an engaged position or in a disengaged position, for example by monitoring a pressure in a parking brake air circuit.

The computer system 50 is preferably located inside the cabin 24 and comprises a processing circuitry 51. The computer system 50 and processing circuitry 51 are shown extremely schematically in FIG. 1 and are not representative of their real form.

Figure 2:
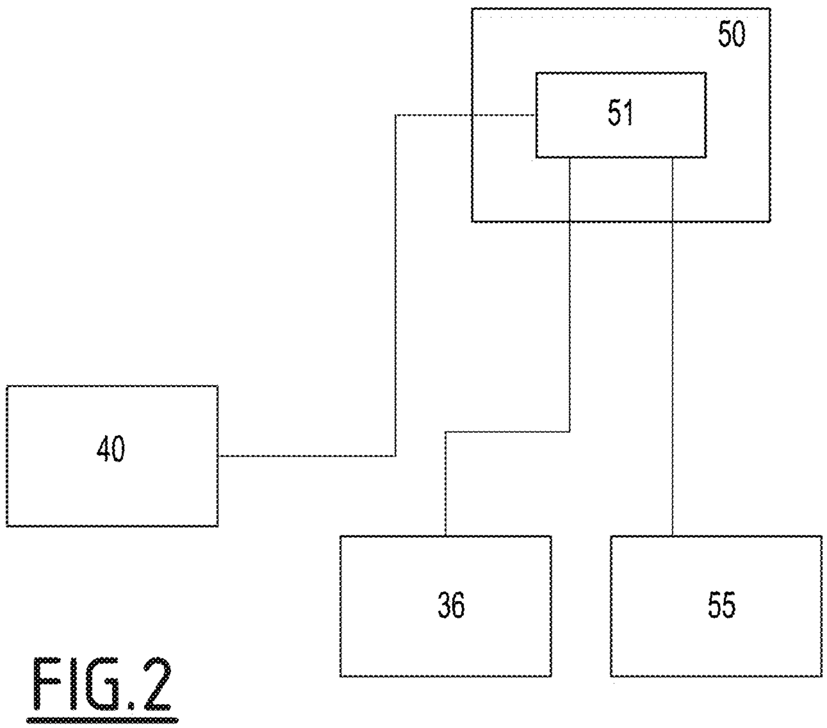
FIG. 2 is an exemplary diagram showing a computer system and elements with which it interacts according to an example.

FIG. 2 is an exemplary system diagram according to an example of the computer system 50. The computer system 50 comprises the processing circuitry 51. The processing circuitry 51 is configured to receive information from the at least one sensor 40, to send information on a human machine interface, or HMI 55, and lock or unlock the tractor vehicle parking brake 36. The HMI 55 may be a display screen provided on tractor vehicle dashboard.

The processing circuitry 51 may receive information from at least one sensor 40 through electric cable communication, or through wireless communication, for example via Bluetooth transmission. In the case where the processing circuitry 51 receives information from multiple sensors 40, each sensor 40 may communicate through either electric cable or wireless communication processes. Similarly, the processing circuitry 51 may send information to the HMI 55 and/or lock or unlock the tractor vehicle parking brake 36 via electric cable(s) or using wireless communication.

Figure 3:
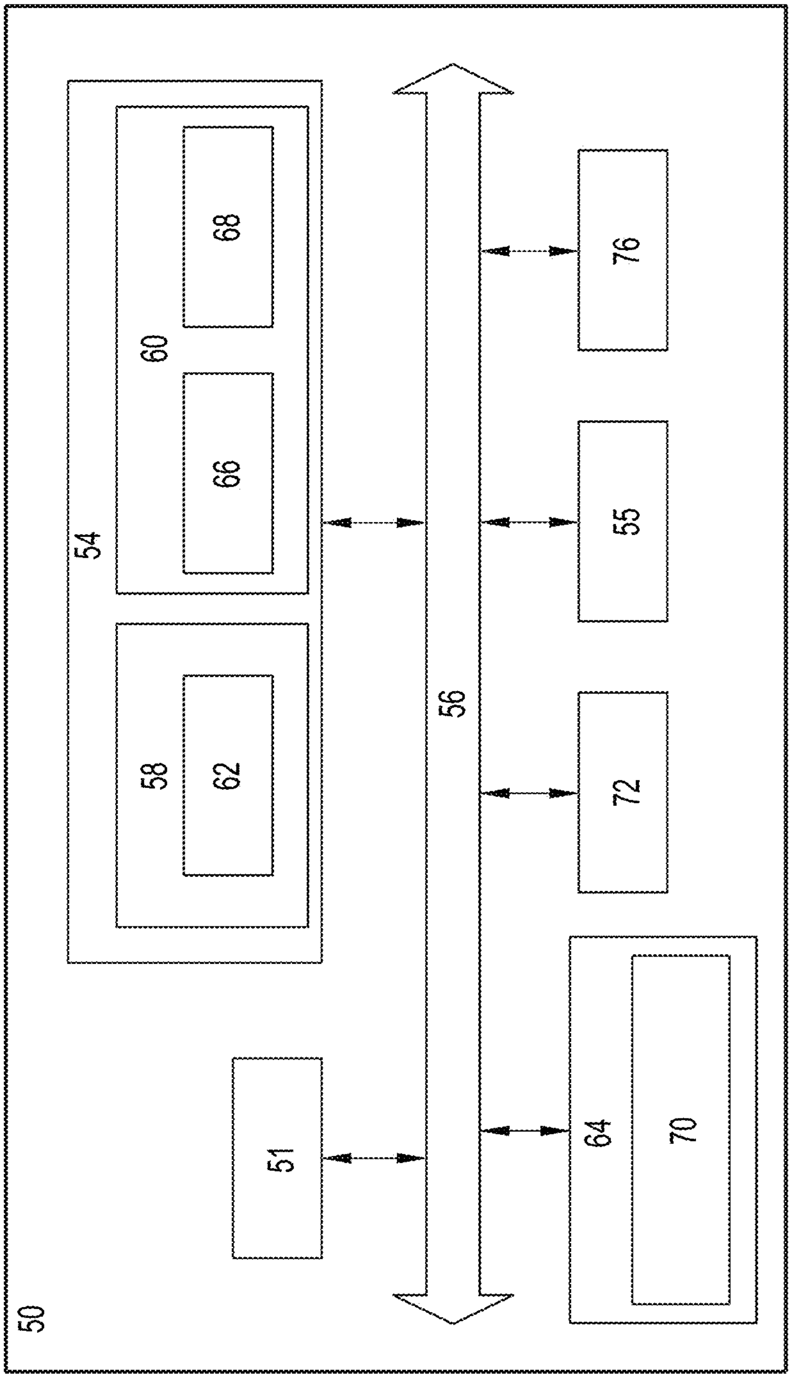
FIG. 3 is a schematic diagram of an exemplary computer system for implementing examples disclosed herein, according to an example.

FIG. 3 is a more detailed schematic diagram of the computer system 50. The computer system 50 is adapted to execute instructions from a computer-readable medium to perform these and/or any of the functions or processing described herein. The computer system 50 may be connected, e.g., networked, to other machines in a LAN, an intranet, an extranet, or the Internet. While only a single device is illustrated, the computer system 50 may include any collection of devices that individually or jointly execute a set, or multiple sets, of instructions to perform any one or more of the methods discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set, or multiple sets, of instructions to perform any one or more of the methods discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN), a Local Interconnect Network (LIN), a bus, etc.

The computer system 50 comprises at least one computing device or electronic device capable of including firmware, hardware, and/or executing software instructions to implement the functionality described herein. The computer system 50 includes the processing circuitry 51, which may include one or more processor devices or control units, a memory 54, and a system bus 56. The computer system 50 may include at least one computing device having the processing circuitry 51. The system bus 56 provides an interface for system components including, but not limited to, the memory 54 and the processing circuitry 51. The processing circuitry 51 may include any number of hardware components for conducting data or signal processing or for executing computer code stored in the memory 54. The processing circuitry 51 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 51 may further include a computer executable code that controls operation of the programmable device.

The system bus 56 may be any of several types of bus structures that may further interconnect to a memory bus, with or without a memory controller, a peripheral bus, and/or a local bus using any of a variety of bus architectures.

The memory 54 may be one or more devices for storing data and/or computer code for completing or facilitating methods described herein. The memory 54 may include database components, object code components, script components, or other types of information structure for supporting the various activities herein. Any distributed or local memory device may be utilized with the system and methods of this description. The memory 54 may be communicably connected to the processing circuitry 51, e.g., via a circuit or any other wired, wireless, or network connection, and may include computer code for executing one or more processes described herein. The memory 54 may include a non-volatile memory 58, such as read-only memory (ROM), erasable programmable read-only memory (EPROM), electrically erasable programmable read-only memory (EEPROM), etc., and a volatile memory 60 such as random-access memory (RAM), or any other medium which can be used to carry or store desired program code in the form of machine-executable instructions or data structures and which can be accessed by a computer or other machines with processing circuitry 51. A basic input/output system (BIOS) 62 may be stored in the non-volatile memory 58 and can include the basic routines that help to transfer information between elements within the computer system 50.

The computer system 50 may further include or be coupled to a non-transitory computer-readable storage medium such as the storage device 64, which may comprise, for example, an internal or external hard disk drive (HDD) such as an enhanced integrated drive electronics (EIDE) or a serial advanced technology attachment (SATA), HDD such as EIDE or SATA for storage, flash memory, or the like. The storage device 64 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 64 and/or in the volatile memory 60, which may include an operating system 66 and/or one or more program modules 68.

All or a portion of the examples disclosed herein may be implemented as a computer program 70 stored on a transitory or non-transitory computer-usable or computer-readable storage medium, e.g., single medium or multiple media, such as the storage device 64, which includes complex programming instructions, e.g., complex computer-readable program code, to cause the processing circuitry 51 to carry out actions described herein. Thus, the computer-readable program code of the computer program 70 can comprise software instructions for implementing the functionality of the examples described herein when executed by the processing circuitry 51. In some examples, the storage device 64 may be a computer program product, e.g., readable storage medium, storing the computer program 70 thereon, where at least a portion of a computer program 70 may be loadable, e.g., into a processor, for implementing the functionality of the examples described herein when executed by the processing circuitry 51. The processing circuitry 51 may serve as a controller or control system for the computer system 50 that is to implement the functionality described herein.

The computer system 50 may include an input device interface 72 configured to receive, from the driver, input and selections to be communicated to the computer system 50 when executing instructions, such as from a keyboard, mouse, touch-sensitive surface, etc. Such input devices may be connected to the processing circuitry 51 through the input device interface 72 coupled to the system bus 56, but can be connected through other interfaces, such as a parallel port, an Institute of Electrical and Electronic Engineers (IEEE) 1394 serial port, a Universal Serial Bus (USB) port, an IR interface, and the like. The computer system 50 may include an output device interface configured to forward output, such as to a display, a video display unit, e.g., a liquid crystal display (LCD) or a cathode ray tube (CRT). In the examples shown in FIGS. 1 to 3, the output device interface is the HMI 55. The input device interface 72 and the output device interface may be the same device, for example if the device is a touch-sensitive screen. The computer system 50 may include a communications interface 76 suitable for communicating with a network, as appropriate or desired.

A coupling procedure/sequence is performed to properly couple/attach the semi-trailer 22 to the tractor vehicle 21 so that the semi-trailer 22 can be safely transported. Similarly, the tractor vehicle 21 and the semi-trailer 22 need to be uncoupled from each other through a proper/dedicated uncoupling procedure. The coupling and uncoupling procedures comprise several steps that need to be performed properly by the truck driver in order to limit safety risks and risks of damaging the equipment.

For the coupling procedure, the driver needs to engage reverse gear and moves the tractor vehicle backwards, slowly, in direction of the semi-trailer 22 until the fifth wheel 32 reaches a position adjacent to kingpin 31. Then, the driver applies the tractor vehicle parking brake 36. The driver gets down from the cab 24 and moves the support legs 35 up into retracted configuration. Then, the truck driver couples the kingpin 31 to the fifth wheel 32, connects the electrical line 33 to the semi-trailer 22 and couples the pneumatic hose 34 to the semi-trailer 22, so that all the elements are in the first safe position. If there are more than one electrical line 33 and more than one pneumatic hose 34, then the driver connects all the electric lines 33 and couples all the pneumatic hoses 34 to the semi-trailer 22. These actions are preferably performed in the order presented here, but may also be performed in another order, for example, coupling the pneumatic hose 34 before connecting the electrical line 33. The support legs 35 may be moved manually using a crank lever or automatically, by pressing a button provided on semi-trailer controlling their rise.

For the uncoupling procedure, the truck driver stops the vehicle and engages the tractor vehicle parking brake 36, moves the support legs 35 into the deployed configuration, uncouples the pneumatic hose 34 to the semi-trailer 22, disconnects the electrical line 33 to the semi-trailer 22 and uncouples the kingpin 31 and the fifth wheel 32, so that all the elements are in the second safe position. If there are more than one electrical line 33 and more than one pneumatic hoses 34, then the driver disconnects all the electric lines 33 and uncouples all the pneumatic hoses 34 to the semi-trailer 22. These actions are preferably performed in the order presented here. As the coupling and uncoupling procedures rely notably on fifth wheel 32 coupling and uncoupling, it can be said that the coupling or uncoupling of the semi-trailer 22 to the tractor vehicle 21 is done through what is called fifth wheel coupling.

In order for the computer system 50 to verify that the coupling or the uncoupling procedure has been properly performed, the truck driver may indicate, for example using the HMI 55, or through a specific button located in the cabin 24, his intention to perform a coupling or an uncoupling procedure. In some examples, the truck driver may select one between a coupling mode and an uncoupling mode. The coupling mode is selected if the semi-trailer 22 is to be attached to the tractor vehicle 21, and the uncoupling mode is selected if the semi-trailer 22 is to be detached from the tractor vehicle 21. The selection is performed using for example the HMI 55 or specific button located in the cabin 24, before starting the coupling or uncoupling operations.

In some examples, a verification that the coupling or uncoupling procedure has been properly performed is done only if the truck parking brake 36 is in engaged/applied status. The processing circuit 51 of the computer system 50 checks if the parking brake 36 is engaged using information provided by sensor 40*f*. In that case, if the truck driver selects the coupling or uncoupling modes but the truck parking brake 36 is not engaged, a message may be displayed on the HMI 55, to inform the truck driver that the verification that the coupling or uncoupling procedure has been properly performed cannot be launched until the parking brake 36 is engaged. In variant, the tractor vehicle parking brake 36 can be automatically engaged if the driver selects coupling or uncoupling mode with the parking brake 36 not applied/engaged.

In another variant, particularly advantageous, the processing circuitry 51 of the computer system 50 continuously monitors the position/configuration of the 'plurality of elements' to which it is referred to in this paper in order to be capable of automatically detecting that a coupling or uncoupling procedure is happening. Basically, the computer system 50 monitors the sensors values so that it can detect any modification/change. For example, the computer system 50 can detect a voltage modification on the semi-trailer power supply line 33, or a pressure modification on the semi-trailer pneumatic supply line 34, or a movement on the fifth wheel coupling. For example, if the computer system 50 detects that the pressure on semi-trailer pneumatic supply line 34 drops to zero or that the voltage on semi-trailer power supply line 33 drops to 0V, then it considers that uncoupling procedure is happening. Similarly, if the computer system 50 detects that the pressure on semi-trailer pneumatic supply line 34 increases up to a certain level or that the voltage on semi-trailer 22 power supply line 33 reaches a certain positive voltage, then it considers that a coupling procedure is happening. The same applies for the support legs 35 and fifth wheel coupling: If the computer system 50 detects a movement of the support legs 35 or of the fifth wheel coupling elements, then it deduces that a coupling or uncoupling procedure is happening.

For safety reasons, the computer system 50 considers that a coupling or uncoupling procedure is happening when it detects modifications/changes of at least one parameter, e.g. voltage change or air pressure change or support legs 35 movement or fifth wheel coupling in combination with other vehicle information, such as vehicle speed and/or driver location (inside or outside cab). Typically, vehicle speed can be checked to confirm that the vehicle is at standstill, which is a necessary requirement of the coupling or uncoupling sequence; Also, driver seat sensor can provide some information about driver location, and can help to confirm that a coupling sequence or uncoupling sequence has been initiated since the driver needs to get out of the cab to complete uncoupling or coupling sequence. This allows to achieve some redundancy and eliminates the risk of false detection due to, for instance, a cable or hose, accidental disconnection. As a result, it is possible to prevent automatic application of the tractor parking brake 36 in driving conditions, or in other inappropriate situations.

Figure 4:
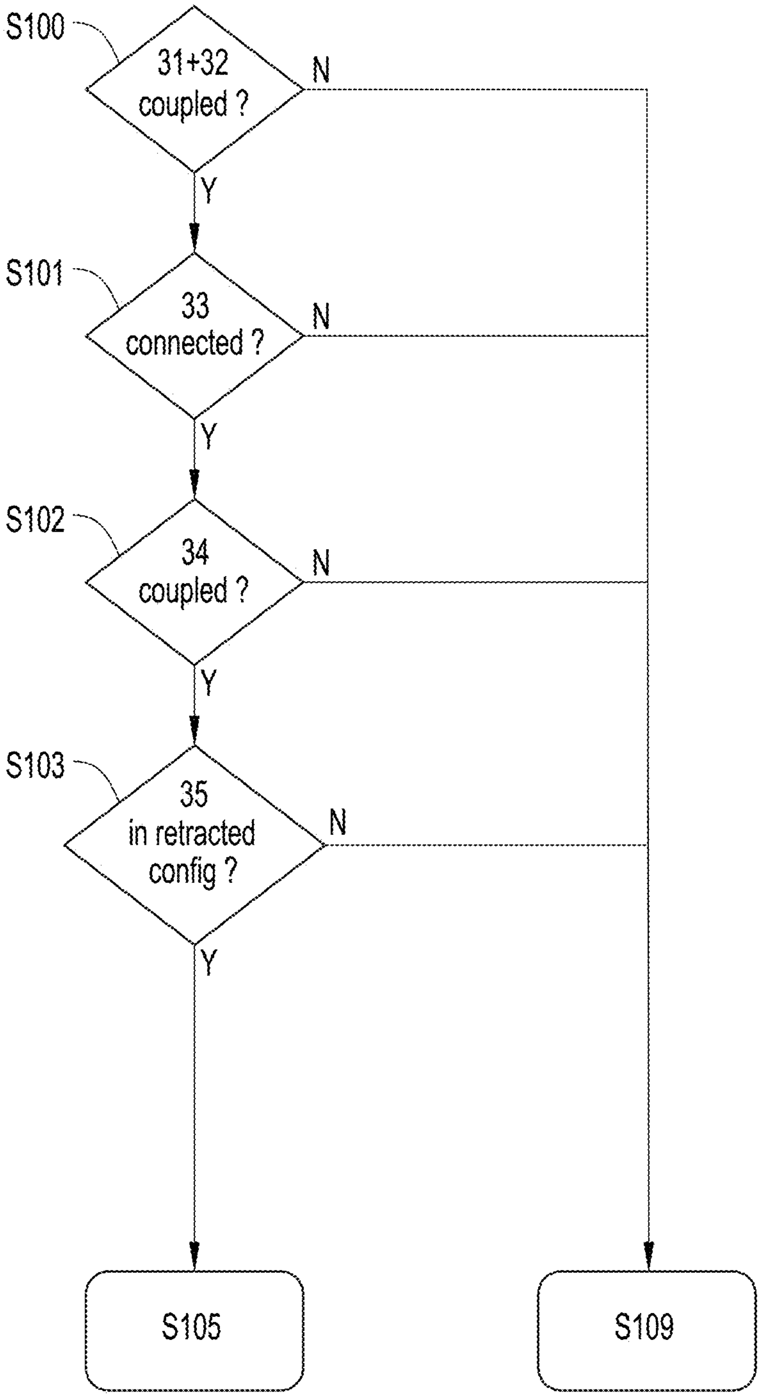
FIG. 4 is an exemplary diagram of a method for assisting in coupling or uncoupling a semi-trailer, wherein a coupling mode has been selected.
Figure 5:
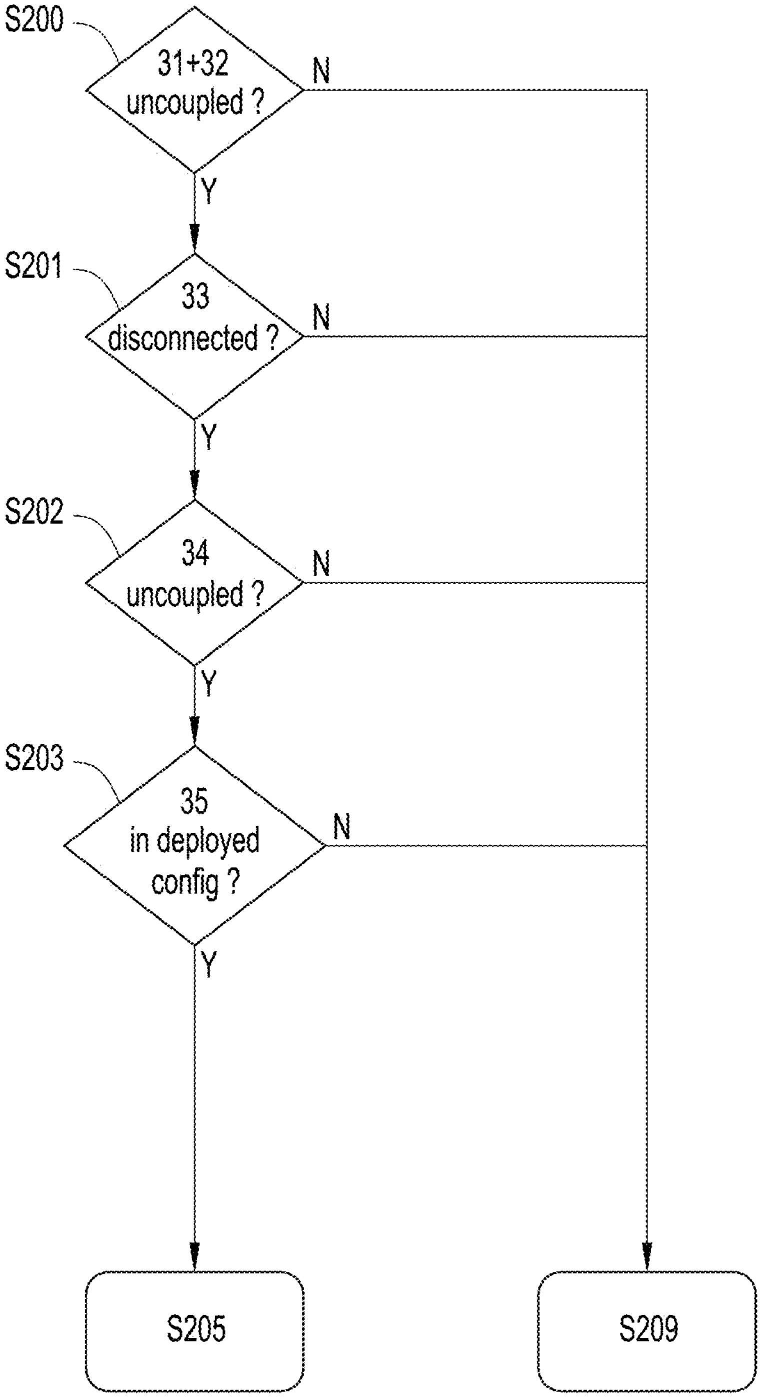
FIG. 5 is an exemplary diagram of the method wherein an uncoupling mode has been selected.

Methods to assist in coupling or uncoupling the semi-trailer 22 to the tractor vehicle 21 are described in FIG. 4 and FIG. 5. More precisely, in FIG. 4 is detailed a method used to verify that the coupling procedure has been properly performed. In the example of FIG. 4, the truck driver has selected the coupling mode. In variant, it is also possible that the computer system has automatically detected that a coupling procedure was happening.

The processing circuitry 51 of the computer system 50 checks if the different elements 31, 32, 33, 34 and 35 of the truck 20 are in the first safe position. More specifically, the processing circuitry 51 performs action S100, wherein the processing circuitry 51 uses information provided by sensor 40*d* to determine whether the fifth wheel 32 and the kingpin 31 are properly coupled together, and are therefore, in the first safe position. If that is the case, the processing circuitry 51 performs an action S101. To do so, the processing circuitry 51 uses information provided by sensor 40*b* to determine if the electrical line 33, or in some examples, multiple electrical lines 33 are properly connected to the semi-trailer 22, and therefore in the first safe position. If that is the case, the processing circuitry 51 performs action S102. To do so, the processing circuitry 51 uses information provided by the sensor 40*a* to determine whether the pneumatic hose 34, or in some examples, multiple pneumatic hoses 34, are properly coupled to the semi-trailer 22, and therefore in the first safe position. The processing circuitry 51 may for example determine that the pressure measured by the sensor 40*a* is over a certain threshold, indicative of a proper coupling, for example with no leaks. If the processing circuitry 51 determines that the pneumatic hose 34 is properly coupled with the semi-trailer 22, the processing circuitry 51 performs action S103. To do so, the processing circuitry 51 uses information provided by the sensor 40*e* to determine if the support legs 35 are in the retracted configuration and are therefore in the first safe position. If that is the case, then the processing circuitry 51 performs action S105. To do so, the processing circuitry 51 does not lock the tractor vehicle parking brake 36, thereby allowing the truck driver to release/disengage the tractor vehicle parking brake 36 and drive away the tractor vehicle 21 and the semi-trailer 22. As an option, when performing action S105, the processing circuitry 51 may also send a validation feedback signal to the HMI 55, to inform the driver that the coupling procedure was successfully performed and that the vehicle tractor parking brake 36 can be released/disengaged. Action S105 is performed only if, in all the previous actions S100 to S103, the elements 31, 32, 33, 34 and 35 were verified to be in the first safe position, in other words that the checks performed in actions S100 to S104 all had a positive outcome.

In some examples, if actions S100 to S103 have been successfully performed, before performing actions S105, the processing circuitry may send a request asking the driver to confirm the state of additional elements, not monitored by the processing circuitry 51. For example, such additional elements may comprise wheel chocks, placed under wheels of the semi-trailer 22. The request may then ask the truck driver to confirm that the wheel chocks have been removed from under the wheels of the semi-trailer 22. As another example, the additional elements may be the support legs 35 if the semi-trailer 22 is not equipped with sensor 40*c*, the request may then ask the truck driver to confirm that the support legs 35 are in the retracted configuration. If the driver confirms, then action S105 is performed.

If, when performing one of the actions S100 to S103, the processing circuitry 51 determines that one of the elements 31, 32, 33, 34 and 35 is not in the first safe position, but in the second safe position or in the third position, then the processing circuitry 51 performs action S109. When performing action S109, the processing circuitry 51 locks the tractor vehicle parking brake 36 in the engaged position, so that it cannot be released/disengaged by the truck driver. In other words, parking brake release is inhibited. Action S109 may also comprise sending a warning feedback signal to the HMI 55. The warning feedback signal may comprise information that the parking brake 36 is locked in applied status and that the coupling procedure/sequence was not performed properly or is incomplete. The warning feedback signal may also comprise information on which element or elements 31, 32, 33, 34 or 35 are not in the first safe position, and instructions on how to put the element or elements 31, 32, 33, 34 or 35 in the first safe position. In order to manually unlock the tractor vehicle parking brake, the driver needs to operate a manual control element, called 'override switch', located inside tractor cab, e.g. on vehicle dashboard. The operation of such control element enables to override the inhibition and therefore to release the tractor vehicle parking brake. However, the driver has been informed and cannot ignore that something during coupling or uncoupling went wrong. As a result, the driver can stop and proceed with some verifications before taking the road.

FIG. 5 illustrates a method used to verify that the uncoupling procedure has been properly performed. In the example of FIG. 5, the truck driver has selected the uncoupling mode. In variant, it is also possible that the computer system has automatically detected that an uncoupling procedure was happening. The processing circuitry 51 of the computer system 50 checks if the different elements 31, 32, 33, 34 and 35 of the truck 20 are in the second safe mode.

More specifically, when performing action S200, the processing circuitry 51 uses information provided by sensor 40*d* to determine whether or not the combination of the fifth wheel 32 and the kingpin 31 is uncoupled, and is therefore, in the second safe position. If that is the case, the processing circuitry 51 performs action S201. To do so, the processing circuitry 51 uses information provided by sensor 40*b* to determine if the electrical line 33, or in some examples, multiple electrical lines 33, are properly disconnected to the semi-trailer 22, and therefore in the second safe position. If that is the case, the processing circuitry 51 performs action S202. To do so, the processing circuitry 51 uses information provided by the sensor 40*a* to determine whether the pneumatic hose 34, or in some examples, multiple pneumatic hoses 34, are properly uncoupled to the semi-trailer 22, and therefore in the second safe position. If the processing circuitry 51 determines that the pneumatic hose 34 is properly uncoupled to the semi-trailer 22, the processing circuitry 51 performs action S203. To do so, the processing circuitry 51 uses information provided by the sensor 40*e* to determine if the support legs 35 are in the deployed configuration and are therefore in the second safe position. If that is the case, then the processing circuitry 51 performs action S205. To do so, the processing circuitry 51 unlocks the tractor vehicle parking brake 36. This means that the truck driver can disengage the tractor vehicle parking brake 36 and drive away the tractor vehicle 21, without the semi-trailer 22. As an option, when performing action S205, the processing circuitry 51 may also send a validation feedback signal to the HMI 55, to inform the driver that the uncoupling procedure was successfully performed and that the vehicle tractor parking brake 36 is unlocked. Action S205 is performed only if, during all the previous actions S200 to S203, the elements 31, 32, 33, 34 and 35 were verified to be in the second safe position by the processing circuitry 51, in other words that the checks performed at steps S200 to S203 all had a positive outcome.

In some examples, similarly as what was described for the coupling procedure, if actions S200 to S203 have been successfully performed, before performing action S205, the processing circuitry may send a request asking the driver to confirm the state of additional elements, not monitored by the processing circuitry 51. For example, such additional elements may comprise wheel chocks, placed under wheels of the semi-trailer 22. The request may then ask the truck driver to confirm that the wheel chocks have been placed under the wheels of the semi-trailer 22. As another example, the additional elements may be the support legs 35 if the semi-trailer 22 is not equipped with sensor 40*e*, the request may then ask the truck driver to confirm that the support legs 35 are in the deployed configuration. If the driver confirms, then action S205 is performed.

If during one of those actions S200 to S203, the processing circuitry 51 determines that one of the elements 31, 32, 33, 34 or 35 is not in the second safe position, but in the first safe position or in the third position, then the processing circuitry 51 performs action S209. When performing action S209, the processing circuitry 51 locks the tractor vehicle parking brake 36 in the engaged position, so that it cannot be disengaged by the truck driver. A warning feedback signal is also sent to the HMI 55, and may comprise information that the parking brake 36 is locked and that the coupling procedure was not performed properly or is incomplete. The warning feedback signal may also comprise information on which element or elements 31, 32, 33, 34 or 35 are not in the second safe position, and instructions on how to put the element or elements 31, 32, 33, 34 or 35 in the second safe position.

As a variant that is not represented, the truck 20 may be any type of heavy-duty vehicle comprising a tractor unit with a fifth wheel and a semi-trailer with a kingpin adapted to be coupled with the fifth wheel of the tractor unit.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence. In particular, the actions S100 to S103 may be performed concurrently or with partial concurrence, and the actions S200 to S203 may be performed concurrently or with partial concurrence.

Figure 6:
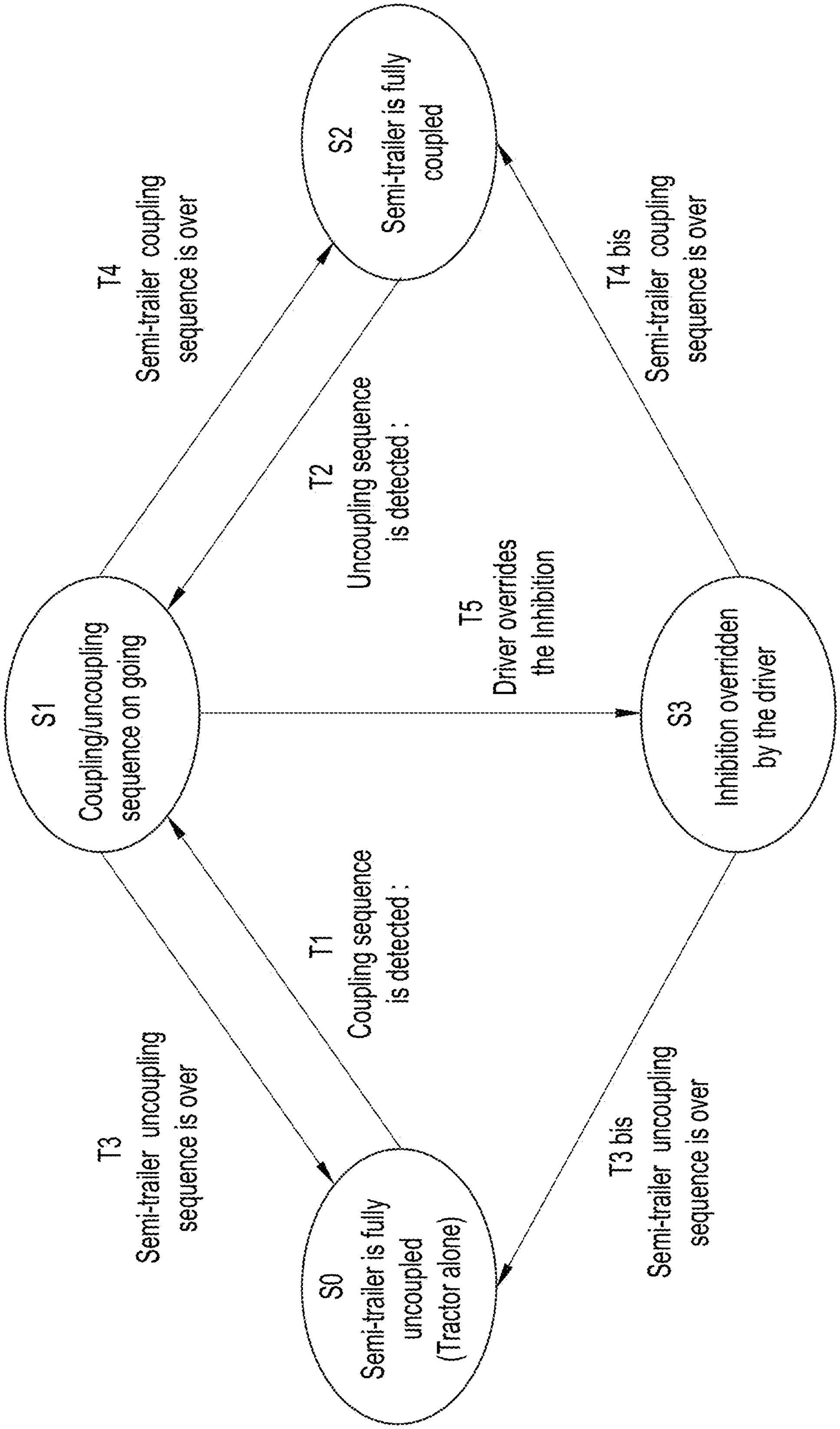
FIG. 6 is a schematic representation of the different possibilities and transitions between the coupled configuration (tractor combined with semi-trailer) and uncoupled configuration (tractor alone).

FIG. 6 is a summary of the possible states/configurations and transitions between coupled mode and uncoupled mode, or reversely. At state S0, the tractor vehicle 21 is alone, meaning that it does not transport any semi-trailer 22. Transition T1 consists of detecting that a coupling sequence is happening. As indicated above, this can be achieved by monitoring continuously the sensors values, a coupling sequence being considered as 'started' or 'on-going' as soon as the program observes a change representative of a connection or a movement, based on sensors feedback. Functional safety will be managed by checking other vehicle information (such as vehicle speed and/or driver location) to make sure that a coupling or uncoupling sequence has actually been initiated. Transition T1 leads to a configuration/state S1 where the coupling sequence is on-going. During transition T4, the coupling sequence continues and leads to state S2 where the semi-trailer 22 is fully coupled to tractor vehicle 21. From state S2, Transition T2 consists of detecting that an uncoupling sequence is happening. As indicated above, this can be achieved by monitoring continuously the sensors values, an uncoupling sequence being considered as 'started' or 'on-going' as soon as the program observes a change representative of a disconnection or a movement, based on sensor feedback. Transition T2 leads to a configuration/state S1 where the uncoupling sequence is on-going. During transition T3, the uncoupling sequence continues and leads to state S0 where the semi-trailer 22 is fully detached from the tractor vehicle 21.

In state S0, the trailer connection assist function is inactive, tractor vehicle parking brake release is allowed and HMI feedback "trailer is fully uncoupled" is sent to the Instrument cluster. In state S2, the trailer connection function is inactive, parking brake release is allowed and HMI feedback "trailer is fully coupled" is sent to the Instrument cluster. In state S1, the trailer coupling assist function is active, tractor vehicle parking brake 36 is applied automatically when entering this state, tractor Parking brake release is inhibited and HMI feedback is sent to the Instrument cluster.

If the coupling or uncoupling sequence is not achieved properly, for instance if some of the steps are missing or not completed properly (e.g. not fully connected), then tractor vehicle parking brake release is inhibited and a warning message is displayed on tractor vehicle HMI 55. The driver can decide to override the inhibition to which it is referred to above by operating a manual control element, e.g. an override switch provided on tractor dashboard. Then, from state S1 wherein the coupling sequence or uncoupling sequence is considered as 'on-going', the activation of override switch leads to a transition T5 that results in a state/configuration S3 called 'inhibition overridden by the driver'. In state S3, the semi-trailer connection assist function is overridden: tractor vehicle parking brake release 36 is allowed and HMI feedback "function suspended" sent to the Instrument cluster.

State S3 then transits either to the fully uncoupled state S0 (transition T3*bis* on FIG. 6) or to the fully coupled state S2 (transition T4*bis*).

Example 1: A computer system 50, for assisting in coupling or uncoupling a semi-trailer 22 to a tractor vehicle 21 through fifth wheel coupling, comprising a processing circuitry 51 configured to:
- use information provided by at least one sensor 40*a*, 40*b*, 40*d*, 40*c* to automatically check whether a plurality of elements 31, 32, 33, 34, 35 of the semi-trailer 22 and the tractor vehicle 21 are in a first safe position, in a second safe position or in a third position;
- enable S105, S205 a tractor vehicle parking brake 36 to be released if all the elements 31, 32, 33, 34, 35 are in the first safe position or if all the elements 31, 32, 33, 34, 35 are in the second safe position; and
- lock S109, S209 the tractor vehicle parking brake 36 in an engaged position if at least one of the elements 31, 32, 33, 34, 35 is in a different position than the others or in the third position.

Example 2: The computer system 50 of example 1, wherein the processing circuitry 51 is configured to send a warning feedback signal on a human machine interface 55 located in a cabin 24 of the tractor vehicle 21 if at least one of the elements 31, 32, 33, 34, 35 is in a different position than the others or in the third position.

Example 3: The computer system 50 of example 1 or 2, wherein the processing circuitry 51 is configured to select one mode between a coupling mode and an uncoupling mode.

Example 4: The computer system 50 of example 3, wherein the processing circuitry 51 is configured to continuously monitor information provided by the at least one sensor 40*a*, 40*b*, 40*d*, 40*e* in order to detect any change of position and as result to deduce that a coupling or uncoupling sequence has been initiated and select the same.

Example 5: The computer system 50 of Example 3 or 4, wherein the processing circuitry 51 is configured to, when the coupling mode or uncoupling mode is selected, check if the tractor vehicle parking brake 36 is in applied status and, failing that, to automatically engage the tractor vehicle parking brake 36.

Example 6: The computer system of any of the previous examples, wherein the processing circuitry 51 is configured to enable the release of the tractor vehicle parking brake only after receiving a manual override signal or after semi-trailer is fully coupled or uncoupled.

Example 7: The computer system of any one of examples 3 to 6, wherein the processing circuitry 51 is further configured to, when the coupling mode is selected, check if all the elements 31, 32, 33, 34, 35 are in the first safe position.

Example 8: The computer system of any one of examples 3 to 7, wherein, when the coupling mode is selected, the warning feedback signal comprises information on each element 31, 32, 33, 34, 35 that is in the second safe position or in the third position.

Example 9: The computer system of any one of examples 3 to 8, wherein the processing circuitry 51 is further configured to, when the coupling mode is selected, send a validation feedback signal on the human machine interface 55 located in the cabin 24 if all the elements 31, 32, 33, 34, 35 are in the first safe position.

Example 10: The computer system of any one of examples 3 to 9, wherein the processing circuitry 51 is further configured to, when the uncoupling mode is selected, check if all the elements 31, 32, 33, 34, 35 are in the second safe position.

Example 11: The computer system of any one of examples 3 to 10, wherein when the uncoupling mode is selected, the warning feedback signal comprises information on each element 31, 32, 33, 34, 35 that is in the first safe position or in the third position.

Example 12: The computer system of any one of examples 3 to 11, wherein the processing circuitry 51 is further configured to, when the uncoupling mode is selected, send a validation feedback signal on the human machine interface 55 if all the elements 31, 32, 33, 34, 35 are in the second safe position.

Example 13: A computer-implemented method, for assisting in coupling or uncoupling a semi-trailer 22 to a tractor vehicle 21, comprising:
- using information provided by at least one sensor 40*a*, 40*b*, 40*d*, 40*e* to automatically check, by a processing circuitry 51 of a computer system 50, whether a plurality of elements 31, 32, 33, 34, 35 of the semi-trailer 22 and the tractor vehicle 21 are in a first safe position, in a second safe position or in a third position;
- enabling S105, S205 a tractor vehicle parking brake 36 to be released if all the elements 31, 32, 33, 34, 35 are in the first safe position or if all the elements 31, 32, 33, 34, 35 are in the second safe position by the processing circuitry; and
- locking S109, S209 the tractor vehicle parking brake 36 in an engaged position by the processing circuitry 51 if at least one of the elements 31, 32, 33, 34, 35 is in a different position than the others or in the third position Example 14: The method according to example 13, wherein the elements 31, 32, 33, 34, 35 comprise:
- a combination of a fifth wheel 32, located on the tractor vehicle 21 and a kingpin 31, located on the semi-trailer 22;
- an electrical line 33, connected to the tractor vehicle 21;
- a pneumatic hose 34, coupled to the tractor vehicle 21; and
- support legs 35, fitted on the semi-trailer 22.

Example 15: The method according to Example 13 or 14, wherein, in the first safe position:
- the fifth wheel 32 and the kingpin 31 are coupled;
- the electrical line 33 is connected to the semi-trailer 22;
- the pneumatic hose 34 is coupled to the semi-trailer 22; and
- the support legs 35 are in a retracted configuration.

Example 16: The method according to any of Examples 13 to 15, wherein, in the second safe position:
- the fifth wheel 32 and the kingpin 31 are uncoupled;
- the electrical line 33 is disconnected from the semi-trailer 22;
- the pneumatic hose 34 is uncoupled from the semi-trailer 22; and the support legs 35 are in a deployed configuration.

Example 17: A computer program product 70 comprising program code for performing, when executed by the processing circuitry 51, the method of any of the examples 13 to 16.

Example 18: A non-transitory computer-readable storage medium 64 comprising instructions, which when executed by the processing circuitry 51, causes the processing circuitry 51 to perform the method of any of the examples 13 to 16.

Example 19: A truck 20, comprising a tractor vehicle 21, a semi-trailer 22 and the computer system 50 of any of the examples 1 to 12, the tractor vehicle 21 and the semi-trailer 22 comprising a plurality of elements 31, 32, 33, 34, 35 and at least one sensor 40*a*, 40*b*, 40*d*, 40*e* adapted to check whether the elements 31, 32, 33, 34, 35 of the semi-trailer 22 and of the tractor vehicle 21 are in a first safe position, in a second safe position or in a third position.

Example 20: The truck of example 19, wherein the elements 31, 32, 33, 34, 35 comprise:

a combination of a fifth wheel 32, located on the tractor vehicle 21 and a kingpin 31, located on the semi-trailer 22 and adapted to be coupled to the fifth wheel 32;

an electrical line 33, connected to the tractor vehicle 21 and adapted to be connected to the semi-trailer;

a pneumatic hose 34 coupled to the tractor vehicle 21 and adapted to be coupled to the semi-trailer 22; and support legs 35, fitted on the semi-trailer 22 and adapted to be moveable between a retracted configuration and a deployed configuration.

Example 21: The truck 20 of Example 19 or 20, wherein the at least one sensor 40*a*, 40*b*, 40*d*, 40*e* comprises:

a first pressure sensor 40*a*, adapted to detect a coupling of the pneumatic hose 34 with the semi-trailer 22;

a voltage sensor 40*b*, adapted to detect a connection of the electrical line 33 to the semi-trailer 22;

a first position sensor 40*d*, adapted to detect a coupling of the kingpin 31 and the fifth wheel 32; and a second position sensor 40*e*, adapted to detect a configuration of the support legs 35 of the semi-trailer 22.

Example 22: The truck 20 of example 21, wherein the first position sensor 40*d* is a magnetic sensor.

Example 23: The truck 20 of example 21 or 22, wherein the first position sensor 40*d* is an optical sensor.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system, for assisting in coupling or uncoupling a semi-trailer to a tractor vehicle through fifth wheel coupling, comprising a processing circuitry configured to:

use information provided by at least one sensor to automatically check whether a plurality of elements of the semi-trailer and the tractor vehicle are in a first safe position, in a second safe position or in a third position;

enable a tractor vehicle parking brake to be released if all the elements are in the first safe position or if all the elements are in the second safe position;

lock the tractor vehicle parking brake in an engaged position if at least one of the elements is in a different position than the others or in the third position;

select one mode between a coupling mode and an uncoupling mode; and continuously monitor information provided by the at least one sensor in order to detect any change of position and as result to deduce that a coupling or uncoupling sequence has been initiated and select the same.

2. The computer system of claim 1, wherein the processing circuitry is configured to send a warning feedback signal on a human machine interface located in a cabin of the tractor vehicle if at least one of the elements is in a different position than the others or in the third position.

3. The computer system of claim 1, wherein the processing circuitry is configured to, when the coupling mode or uncoupling mode is selected, check if the tractor vehicle parking brake is in applied status and, failing that, to automatically engage the tractor vehicle parking brake.

4. The computer system of claim 1, wherein the processing circuitry is configured to enable the release of the tractor vehicle parking brake only after receiving a manual override signal or after semi-trailer is fully coupled or uncoupled.

5. The computer system of claim 1, wherein the processing circuitry is further configured to, when the coupling mode is selected, check if all the elements are in the first safe position.

6. The computer system according to claim 1, wherein the processing circuitry is further configured to, when the coupling mode is selected, send a validation feedback signal on the human machine interface located in the cabin if all the elements are in the first safe position.

7. The computer system of claim 1 wherein the processing circuitry is further configured to, when the uncoupling mode is selected, check if all the elements are in the second safe position.

8. A computer-implemented method, for assisting in coupling or uncoupling a semi-trailer to a tractor vehicle, comprising:

using information provided by at least one sensor to automatically check, by a processing circuitry of a computer system, whether a plurality of elements of the semi-trailer and the tractor vehicle are in a first safe position, in a second safe position or in a third position;

enabling a tractor vehicle parking brake to be released if all the elements are in the first safe position or if all the elements are in the second safe position by the processing circuitry; and locking the tractor vehicle parking brake in an engaged position by the processing circuitry if at least one of the elements is in a different position than the others or in the third position;

selecting, by the processing circuitry of the computer system, one mode between a coupling mode and an uncoupling mode; and continuously monitoring, by the processing circuitry of the computer system, information provided by the at least one sensor in order to detect any change of position and as result to deduce that a coupling or uncoupling sequence has been initiated and select the same.

9. The method according to claim 8, wherein the elements comprise:

a combination of a fifth wheel, located on the tractor vehicle and a kingpin, located on the semi-trailer;

an electrical line, connected to the tractor vehicle;

a pneumatic hose, coupled to the tractor vehicle; and support legs, fitted on the semi-trailer.

10. The method according to claim 9, wherein, in the first safe position:

the fifth wheel and the kingpin are coupled;

the electrical line is connected to the semi-trailer;

the pneumatic hose is coupled to the semi-trailer; and the support legs are in a retracted configuration.

11. The method according to claim 9, wherein, in the second safe position;

the fifth wheel and the kingpin are uncoupled;

the electrical line is disconnected from the semi-trailer;

the pneumatic hose is uncoupled from the semi-trailer; and the support legs are in a deployed configuration.

12. A truck, comprising a tractor vehicle, a semi-trailer and the computer system of claim 1, the tractor vehicle and the semi-trailer comprising a plurality of elements and at least one sensor adapted to check whether the elements of the semi-trailer and of the tractor vehicle are in a first safe position, in a second safe position or in a third position.

13. The truck of claim 12, wherein the elements comprise:

a combination of a fifth wheel, located on the tractor vehicle and a kingpin, located on the semi-trailer and adapted to be coupled to the fifth wheel;

an electrical line, connected to the tractor vehicle and adapted to be connected to the semi-trailer;

a pneumatic hose coupled to the tractor vehicle and adapted to be coupled to the semi-trailer; and support legs, fitted on the semi-trailer and adapted to be moveable between a retracted configuration and a deployed configuration.

* * * * *